United States Patent Office

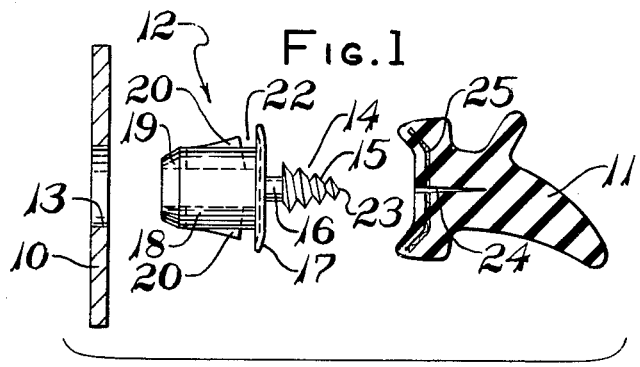
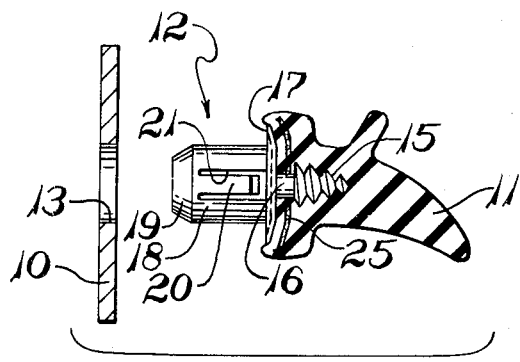
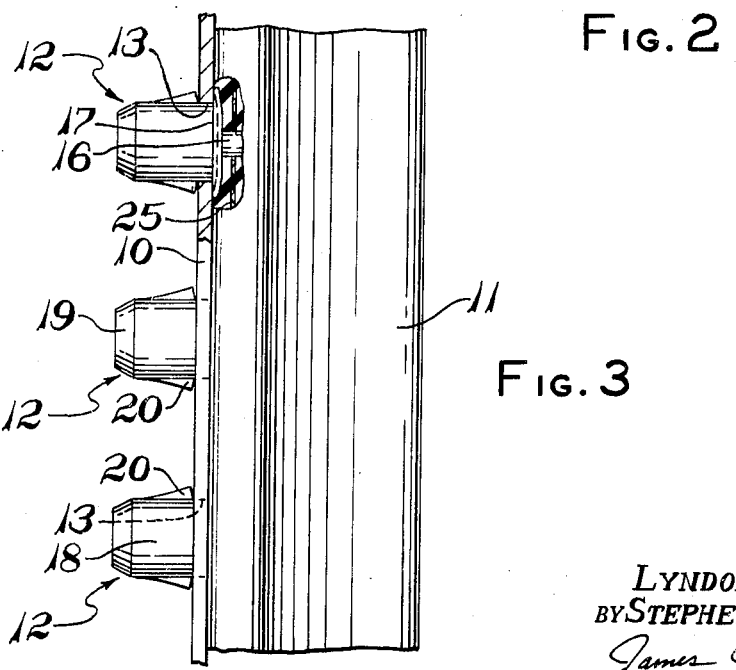

3,213,494
Patented Oct. 26, 1965

3,213,494
SEALING STRIP
Lyndon O. Mayers, Derby, and Stephen M. Karlak, Seymour, Conn., assignors to The B. F. Goodrich Company, New York, N.Y., a corporation of New York
Filed Dec. 6, 1963, Ser. No. 328,616
6 Claims. (Cl. 20—69)

This invention relates to a flexible sealing strip suitable for use around automotive doors to seal the space between the door and the automotive body and pertains more particularly to a fastener for securing such sealing strip in place and to a sealing strip embodying such fastener.

Sealing strips (or weather strips as they frequently are called) customarily are employed around the peripheral face of automotive doors to seal the space between the automotive door and the automotive body and thereby preventing cold air and water from gaining entrance into and warm air from leaking from the interior of the automobile during the colder months and (with air-conditioning apparatus now being installed in automobiles) to prevent the loss of cooled air from the interior of the automobile during the warmer months. Sealing strips of this type normally are formed of a flexible resilient material to enable the sealing strip to be compressed when the automotive door is closed which allows the sealing strip inherently to accommodate slight to moderate variances in the gap between the automotive door and the automotive body. Usually such sealing strips are fabricated of a cellular resilient material (such as expanded rubber, latex foam rubber of polyurethane foam) which if of open-cell construction desirably is provided with an imperforate covering or skin coating to prevent the cellular material from absorbing water. Closed-cell cellular rubber has proven particularly suitable for use in sealing strips since such material inherently is non-absorbent.

Various methods have been devised for attaching the sealing strip to the supporting surface upon which the sealing strip is to be mounted. Such methods include merely cementing the sealing strip onto the supporting member with an adhesive which method of attachment, although it was used for many years, is not considered to be entirely satisfactory because the bond between the sealing strip and the surface onto which the sealing strip is adhered often prematurely fails and the sealing strip then becomes loose and needs to be recemented into place. Sealing strips also have been installed using a metal attaching strip that is securely mounted with screws or similar elements onto the surface to which the sealing strip is to be fastened, the attaching strip in combination with the surface to which it is attached firmly grasping a flange of the sealing strip in order to hold the sealing strip in position. The most successful manner of attaching a sealing strip to a supporting member, however, involves the insertion of fastening studs or clips projecting from and secured to the sealing strip into apertures in the supporting member to which the sealing strip is to be attached. One of the earliest developments using studs or clips for attaching a sealing strip to a supporting member is shown in United States Patent No. 2,579,072 which discloses the use of a crimped wire embedded in the sealing strip which wire at intervals is bent to form spaced generally diamond-shaped wire clips that project from the sealing strip and which fit into apertures in the supporting surface and hold the sealing strip in place.

The present invention provides a novel fastener for attaching a sealing strip securely in place and provides a sealing strip embodying the novel fastener that has been enthusiastically accepted. In accordance with the present invention, the fastener comprises a clip portion adapted for insertion into an aperture in the supporting member and an auger-shaped portion for insertion into the sealing strip. The configuration of the auger-shaped portion of the fastener is such that the fastener is securely held in and by the sealing strip proper. The body of the sealing strip, preferably, also has a reinforcing member extending longitudinally of the sealing strip and desirably embedded within the sealing strip which functions not only to add reinforcement to the sealing strip but also provides an anchorage which assists in retaining the fastener properly secured in the sealing strip.

The invention will be more fully understood by referring to the following description of one embodiment of this invention and by referring to the drawing in which:

FIG. 1 is an exploded view in elevation partly broken away and in section of a sealing strip and fastener in accordance with this invention in association with a metal supporting member;

FIG. 2 is an exploded view in elevation partly broken away and in section of the elements shown in FIG. 1 except that the sealing strip and fastener in this view are in combined association; and FIG. 3 is a bottom plan view partly broken away and in section depicting a short length of the sealing strip portrayed in FIGS. 1 and 2 with three spaced fasteners shown embedded therein, the section of sealing strip shown being secured to the metal supporting member with the three fasteners.

Automobile doors customarily are of a hollow construction and may be thought of as comprising basically an exterior face, an interior face and a peripheral face disposed between and connecting the exterior and interior faces of the door along their peripheral margins. The exterior and peripheral faces of the door normally are fabricated primarily of sheel metal while the interior face of the door usually is formed of wood or cardboard paneling covered with upholstery. The sealing strip is attached to the peripheral face of the automotive door. Referring to the embodiment of the invention shown in the drawing, the rigid supporting member 10 to which the sealing strip 11 is mounted is representative of the peripheral metal face of the automotive door. The sealing strip 11 is attached to the supporting member 10 by fasteners 12, 12 positioned at spaced intervals along the length of the sealing strip 11. As will be explained in detail hereinafter, one end of the fastener 12 is securely associated with the sealing strip 11 while the other end of the fastener 12 is provided with a clip arrangement adapted to be inserted into and through an aperture 13, 13 drilled or punched through the supporting member 10.

The portion of the fastener 12 which is secured into the sealing strip 11 comprises a generally conical-shaped auger end 14 that has a continuous helical screw thread 15. The auger end 14 is joined at its base with a shank 16 whose length determines the depth to which the auger end 14 is embedded into the sealing strip 11. A relatively flexible flange 17 extending radially outwardly from the axis of the fastener 12 and separating the portion of the fastener 12 for insertion into the sealing strip 11 from the portion of the fastener 12 for insertion in and through the aperture in the supporting member engages supporting member 10 along the zone bordering the aperture 13 with which the fastener clip is associated and functions as a seal for preventing the leakage of water through the aperture in the supporting member 10. The flange 17 preferably is concavo-convex in configuration with the concave face of the flange 17 facing the portion of the fastener 12 intended for insertion in the supporting member aperture. The clip portion of the fastener 12 which is inserted into and through the aperture in the supporting member 10 and which secures the fastener 12 to supporting member 10 is designated by the numeral 18. The clip portion 18 is generally cylindrical in shape and is hollow and desirably is slightly tapered at its distal end 19 to promote easy insertion of this end of the fastener 12 into the aperture 13 in the supporting member 10. The aperture 13, it will be observed, has a diameter only sufficiently larger than the exterior diameter of the hollow cylindrical component of the clip portion 18 to permit the cylindrical shaped component of the fastener 12 to be inserted without objectionable force into the aperture. The clip portion 18 includes longitudinally-disposed tapered barbs 20, 20 positioned in openings 21 in the wall of the hollow cylindrical portion but projecting exteriorly from the exterior surface of the cylindrical portion. The barbs 20, 20 are hinged at the distal end thereof only to allow the barbs 20, 20 to be depressed when the clip portion 18 is being inserted in an aperture 13 so that when depressed the barbs 20, 20 are completely beneath the exterior surface of the hollow cylindrical component of the clip portion 18 which permits the clip portion 18 to be easily inserted into the aperture 13. The space 22 between the flange 17 and the barbs 20, 20 is sufficient to accommodate the thickness of the supporting member 10 and yet permit a fairly snug fit so that flange 17 engages the supporting member 10 and provides the intended water seal. Once the clip portion 18 has been inserted into the aperture 13 a distance sufficient that the wall of the supporting member 10 clears the barbs 20, 20, barbs 20, 20 snap back to their normal undepressed position and prevent the clip portion 18 from being unintentionally withdrawn from the aperture 13.

The auger end 14 can be provided with either a right-handed or left-handed screw thread 15, although a right-handed thread normally is used, and preferably has a blunt rather than a pointed tip 23. As will be more readily apparent from subsequent discussion, the greater the depth of the screw thread 15 the more firmly the aguer end 14 of the fastener is held in the sealing strip 11. Therefore, it is desirable to make the depth of the screw thread 15 of auger end 14 as great as practical and preferably at least equal to one-half the diameter of shank 16 of the fastener 12. At the same time it is desirable that the "core" of the auger end 14 (i.e. the cone onto which the helical screw thread is disposed in the embodiment shown) be as narrow as practical to permit the use of a thread having a depth of fairly substantial proportion without producing a construction having an objectionable maximum width.

In mounting the sealing strip, the fasteners 12, 12 are spaced along the face of the sealing strip 11 intended to abut the supporting member 10 at intervals which equal the spacing between adjacent apertures 13, 13 in the supporting member 10. To facilitate the insertion of the auger end 14 of the fastener 12 into the sealing strip 11, the face of the sealing strip 11 into which the auger end 14 is to be inserted is pierced by a sharp pointed instrument at those places along the sealing strip into which fasteners are to be inserted. The piercing of the sealing strip 11 produces a small perforation 24 into which the auger end 14 of the fastener readily is threaded merely by rotating the fastener 12 about its axis to cause the helical thread 15 of the auger end 14 to bite into the material of the sealing strip 11 and be drawn into the sealing strip 11 as the fastener 12 is rotated in the same manner as when a screw is "screwed" into a piece of wood. The material from which the sealing strip 11 is formed grips the auger end 14 and securely holds this component of the fastener 12 firmly embedded in the matrix of the sealing strip 11. As will be understood, the greater the depth of the screw thread 15 of the auger end 14 and the narrower the core of the auger end 14 the greater will be the area exposed to the matrix of the sealing strip for an auger end of given maximum width and the greater will be the force required to pull the fastener from the sealing strip. The sealing strip 11, further, desirably contains a reinforcing strip 25 extending longitudinally thereof and positioned so that the entire auger end 14 has passed through the reinforcing strip 25 when the auger end 14 of fastener 12 is inserted to the proper depth into the sealing strip 11. The reinforcing strip 25, it will be realized, provides a restraining member against which the base of the auger end 14 will bear if a force tending to pull the fastener 12 from the sealing strip 11 is encountered and, consequently, provides additional resistance to the pulling out of the auger end 14 of the fastener 12 from the sealing strip 11. In the embodiment of the invention shown in the drawing, the reinforcing strip 25 is a fabric strip embedded in the matrix of the sealing strip 11, the depth at which the fabric strip is embedded in the sealing strip 11 being approximately equal to the length of shank 16 of the fastener 12. In place of a fabric reinforcing strip 25, a strip of extruded rubber or similar material can be used. It will be understood that the piercing of the sealing strip 11 to form a perforation into which the auger end of the fastener 12 is to be inserted does not produce a hole that has a diameter equal to the largest root diameter of the auger end of the fastener. Therefore, as the auger end 14 is threaded into the perforation 24, the material of the reinforcing strip 25 surrounding the perforation 24 is not enlarged or even stretched to an opening of sufficient size to allow the maximum width of the helical screw thread 15 to be pulled therethrough unobstructed.

Although the fastener 12 need not be fabricated as an integral unit, it preferably is molded as a single member. The fastener 12 may be made of metal or of a relatively rigid rubber or plastic material. A molded nylon fastener has proven particularly satisfactory for use in this invention. In deciding what material to use for making the fastener it should be remembered that the fastener will be in contact with water periodically and that a material should be chosen which will not be objectionably affected by water.

As pointed out previously, the sealing strip 11 normally is formed of cellular resilient material such as expanded (sponge) rubber, latex foam rubber or polyurethane foam and if formed of an open-cell material generally is provided with an imperforate skin coat to prevent moisture from gaining entrance into the interior of the sealing strip and interfering with the proper function of the sealing strip during the winter months when the absorbed moisture can cause the sealing strip to become frozen. To provide maximum protection against the absorption of moisture by the sealing strip, many sealing strips now are fabricated of a closed-cell cellular material such as closed-cell expanded rubber since this material, having closed cells, inherently does not absorb moisture. Since the sealing strip customarily is formed of a resilient material, it will be appreciated that the spacing between adjacent fasteners embedded in the sealing strip does not need to conform exactly to the spacing between adjacent apertures in the supporting surface into which the clip portions of the fasteners are inserted because the sealing strip can be stretched slightly longitudinally to accommodate slight misalignment of the clip portion 18 of the fastener 12 with the aperture 13 with which the fastener is intended to be associated. Even when a reinforcing strip 25 is included within the sealing strip construction, normally the reinforcing strip 25 will be capable of undergoing at least a small degree of stretching.

We claim:
1. A fastener useful for mounting a flexible resilient sealing strip onto a sheet metal supporting member provided with spaced apertures along the zone along which the sealing strip is to be attached which fastener comprises a generally conical-shaped auger end portion provided with a helical screw thread, said auger end portion being intended for insertion apex-first into the sealing strip to secure the fastener thereto, clip means embodied in the other end of the said fastener intended for insertion into and through one of the said apertures in the sheet metal supporting member, said clip means including means for retaining said clip means in place in the said aperture once said clip means is seated in the aperture, a shank of lesser diameter than the base of the said auger end portion and joined thereto and terminating in a radially extending flange intended to bear against the supporting member when the fastener is combined with the supporting member to seal the aperture into which the clip means of the fastener is inserted against the leakage of water therethrough, the length of said shank determining the depth to which the said auger end portion will be embedded in the sealing strip.

2. A fastener useful for mounting a flexible resilient sealing strip onto a sheet metal supporting member provided with spaced apertures along the zone along which the sealing strip is to be attached which fastener comprises a generally conical-shaped auger end portion provided with a continuous helical screw thread, said auger end portion being intended for insertion apex-first into the sealing strip to secure the fastener thereto, clip means embodied in the opposite end of the fastener intended for insertion into and through one of the said apertures in the sheet metal supporting member, said clip means including a hollow cylindrical-shaped component which has embodied in the walls thereof tapered barbs which become depressed as the clip means is inserted in and through the aperture of the supporting member permitting the clip means to pass unrestricted in and through the aperture but which return to the normal extended position after the clip means has been inserted the proper distance into and through the aperture and prevent the clip means from being pulled back through the aperture through which it initially had been inserted, a shank of lesser diameter than the base of the said auger end portion and joined thereto and terminating in a radially extending concavo-convex flange with the concave face thereof positioned toward the said clip means, said flange being intended to bear against the supporting member when the fastener is combined with the supporting member to seal the aperture into which the clip means of the fastener is inserted against the leakage of water therethrough, the length of said shank determining the depth to which the said auger end portion will be embedded in the sealing strip.

3. In combination, a flexible resilient sealing strip having fasteners for mounting the sealing strip to a sheet metal supporting member which fasteners are spaced at intervals along that face of the sealing strip intended to abut the supporting member which supporting member is provided with apertures therein spaced along the zone along which the sealing strip is to be mounted and spaced to correspond with the spacings between adjacent fasteners combined with the sealing strip, each said fastener comprising at one end thereof a generally conical-shaped auger end portion provided with a continuous helical screw thread which auger end portion is embedded apex-first into the said sealing strip to retain the fastener securely anchored in the sealing strip and at the other end clip means projecting from said sealing strip which clip means are intended for insertion into and through one of the said apertures in the sheet metal supporting member, said clip means including means for retaining said clip means in place in the said aperture once said clip means is seated in the aperture, each said fastener having a shank joined to the base of the auger end portion and terminating in a radially extending flange intended to bear against the supporting member when the clip means is inserted into and through an aperture in the supporting member to seal the aperture into which the clip means is inserted against the leakage of water therethrough, the length of said shank determining the depth to which the auger end portion of the fastener is embedded in the sealing strip when the fastener is inserted into the sealing strip until the said radially extended flange bears against the sealing strip.

4. The combination of claim 3 in which said generally conical-shaped auger end portion is provided with a blunt tip, in which said clip means of said fastener includes a hollow cylindrical-shaped component which has embodied in the walls thereof tapered barbs which become depressed as the clip means is inserted in and through an aperture of the supporting member permitting the clip means to pass unrestricted in and through the aperture but which return to the normal extended position after the clip means has been inserted the proper distance into and through the aperture and prevent the clip means from being pulled back through the aperture through which it initially had been inserted, in which said radially extending flange is a concavo-convex flange with the concave face thereof positioned toward the said clip means, and in which said sealing strip has a reinforcing strip extending longitudinally along the extent of the sealing strip through which the auger end portion of the fastener completely penetrates when the fastener is properly inserted into the sealing strip and against which the auger end portion of the fastener bears if it is attempted to pull the fastener from the strip.

5. The combination of claim 4 in which said reinforcing strip in said sealing strip is fabric and is embedded in the sealing strip to a depth beneath the face of the sealing strip into which the fasteners are inserted approximately equal to the length of the shank of the fastener between the base of the auger end portion and the said radially extending flange of the fastener.

6. In combination, a sheet metal supporting member and a flexible resilient sealing strip having fasteners for mounting the sealing strip to said supporting member, said supporting member being provided with apertures spaced along the zone along which the sealing strip is to be mounted, said fasteners being spaced at intervals along that face of the sealing strip intended to abut the supporting member, the spacing between adjacent fasteners corresponding to the spacing between adjacent apertures in the supporting member so that each fastener inserted in the sealing strip is provided with an aperture in the supporting member in juxtaposition therewith, each said fastener comprising at one end thereof a generally conical-shaped auger end portion provided with a continuous helical screw thread which auger end portion is embedded apex-first into the said sealing strip to retain the fastener securely anchored in the sealing strip and at the other end thereof clip means projecting from said sealing strip, said clip means of each fastener being inserted in and through the aperture in the supporting member that is in juxtaposition with the fastener, said clip means having means retaining this end of the fastener securely in the aperture of the supporting member, each said fastener having a shank joined to the base of the auger end portion and terminating in a radially extending concavo-convex flange with the concave face thereof positioned toward the clip means, said flange bearing against the face of the supporting member abutting the sealing strip and sealing the aperture of the supporting member into and through which the clip means of the fastener extends against leakage of water therethrough, the length of said shank being equal essentially to the depth to which is is desired that the auger end portion of the fastener be embedded in the sealing strip when the fastener is inserted into the sealing strip until the said radially extending flange bears against the sealing strip, said sealing strip having a reinforcing strip extending longitudinally along the extent of the sealing strip through which reinforcing strip the auger end portion of each fastener completely penetrates, the reinforcing strip helping to restrain the auger end portion of the fastener from being pulled from the sealing strip.

References Cited by the Examiner

UNITED STATES PATENTS

| | | | |
|---|---|---|---|
| 156,828 | 11/74 | Taylor | 85—3 X |
| 2,144,171 | 1/39 | Van Uum | 24—213 |
| 2,178,719 | 11/39 | Cotter | 24—73 |
| 2,667,200 | 1/54 | Bedford | 85—80 |
| 3,110,938 | 11/63 | Beck et al. | 20—69 |
| 3,139,784 | 7/64 | Moorman | 20—69 X |

FOREIGN PATENTS 12,563  5/09  Great Britain.

REINALDO P. MACHADO, *Primary Examiner.*

HARRISON R. MOSELEY, *Examiner.*